United States Patent [19]
Focht

[11] Patent Number: 5,013,124
[45] Date of Patent: May 7, 1991

[54] METHOD AND APPARATUS FOR CONNECTING OPTICAL FIBERS

[75] Inventor: J. Richard Focht, Katonah, N.Y.

[73] Assignee: Codenoll Technology Corporation, Yonkers, N.Y.

[21] Appl. No.: 293,719

[22] Filed: Jan. 5, 1989

[51] Int. Cl.⁵ .............................................. G02B 6/38
[52] U.S. Cl. .............................. 350/96.21; 350/96.20
[58] Field of Search .......................... 350/96.20, 96.21

[56] References Cited

U.S. PATENT DOCUMENTS

| | | | |
|---|---|---|---|
| 3,914,015 | 10/1975 | McCartney | 350/96 C |
| 4,110,000 | 8/1978 | Bogar et al. | 350/96.21 |
| 4,140,365 | 2/1979 | Burger et al. | 350/96.20 |
| 4,167,303 | 9/1979 | Bowen et al. | 350/96.21 |
| 4,174,882 | 11/1979 | McCartney | 350/96.21 |
| 4,186,999 | 2/1980 | Harwood et al. | 350/96.21 |
| 4,201,444 | 5/1980 | McCartney et al. | 350/96.21 |
| 4,362,356 | 12/1982 | Williams et al. | 350/96.20 |
| 4,447,121 | 5/1984 | Cooper et al. | 350/96.20 |
| 4,448,478 | 5/1984 | Matthews et al. | 350/96.21 |
| 4,458,983 | 7/1984 | Roberts | 350/96.21 X |
| 4,473,272 | 9/1984 | Johnson | 350/96.21 |
| 4,477,146 | 10/1984 | Bowen et al. | 350/96.21 |
| 4,487,474 | 12/1984 | Nishie et al. | 350/96.21 |
| 4,611,887 | 9/1986 | Glover et al. | 350/96.21 |
| 4,614,402 | 9/1986 | Caron et al. | 350/96.21 |
| 4,666,241 | 5/1987 | Caron | 350/96.21 |
| 4,666,243 | 5/1987 | Rogstadius et al. | 350/96.21 |
| 4,676,588 | 6/1987 | Bowen et al. | 350/96.21 |
| 4,687,291 | 8/1987 | Stape et al. | 350/96.21 |
| 4,711,752 | 12/1987 | Deacon et al. | 264/328.12 |
| 4,737,004 | 4/1988 | Amitay et al. | 350/96.16 X |
| 4,741,590 | 5/1988 | Caron | 350/96.21 |
| 4,746,189 | 5/1988 | Arrington et al. | 350/96.21 |
| 4,747,658 | 5/1988 | Borsuk et al. | 350/96.20 |
| 4,793,683 | 12/1988 | Cannon, Jr. et al. | 350/96.21 |
| 4,812,006 | 3/1989 | Osborn et al. | 350/96.21 |
| 4,812,009 | 3/1989 | Carlisle | 350/96.21 |

Primary Examiner—William L. Sikes
Assistant Examiner—Phan T. Heartney
Attorney, Agent, or Firm—Pennie & Edmonds

[57] ABSTRACT

A method and apparatus for connecting optical fibers is disclosed in which a housing is provided with a built-in alignment channel. An insert is inserted into the alignment channel and precisely and accurately maintains a fiber element concentrically within the alignment channel. A mating optical fiber is also introduced into the alignment channel. Means are provided for adjusting the separation distance between the two optical fibers. The housing is preferably injection molded.

29 Claims, 4 Drawing Sheets

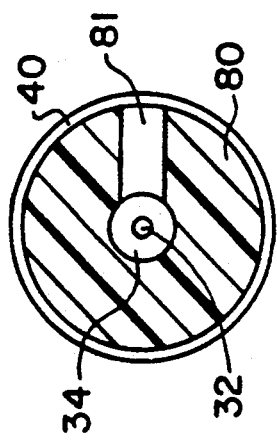
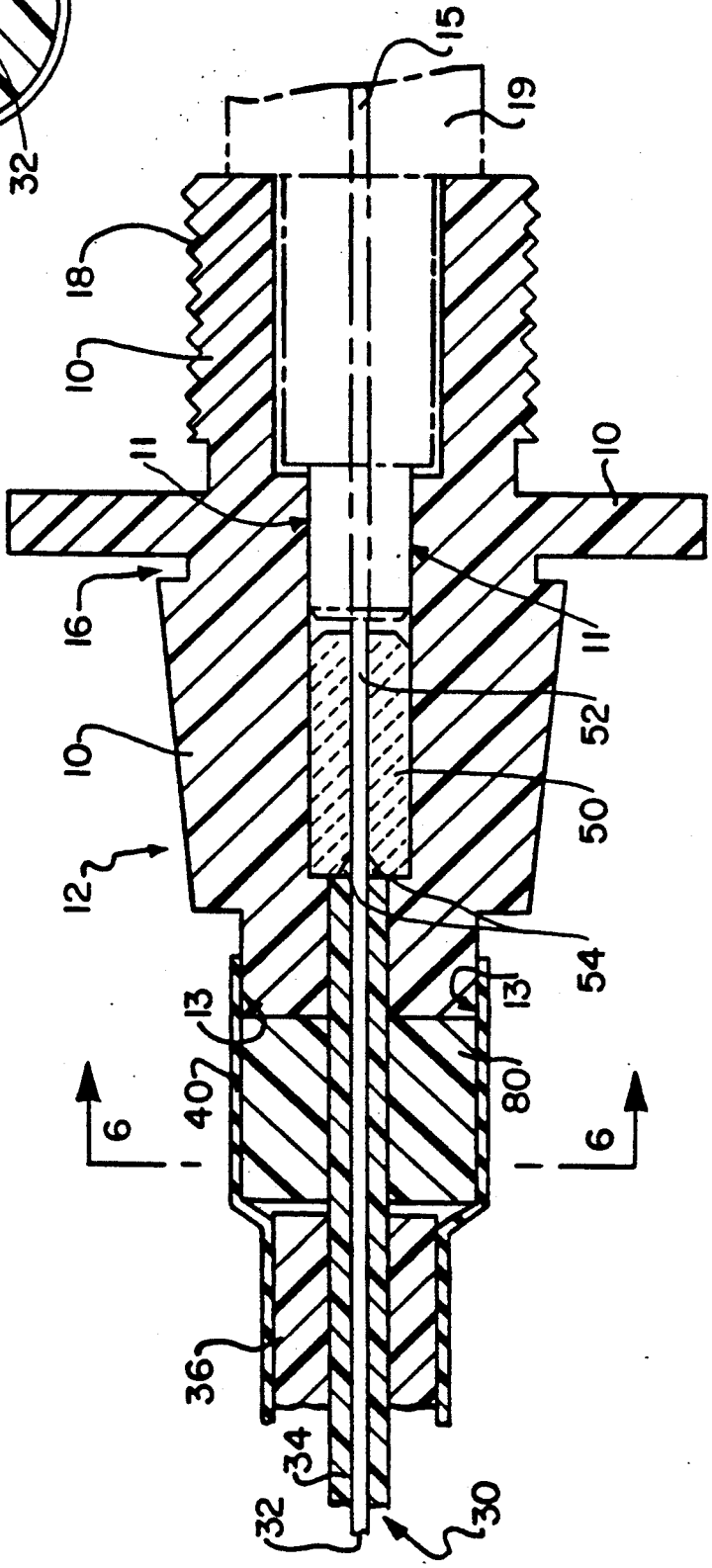

METHOD AND APPARATUS FOR CONNECTING OPTICAL FIBERS

BACKGROUND OF THE INVENTION

This relates generally to connectors and more particularly to fiber optic connectors and methods for joining together two optical fibers.

Data transmission over optical fibers offers many significant advantages compared with metallic conductors, including: long distance transmission without the need for repeaters, immunity from electromagnetic interference, cross-talk and ground lop, high bandwidth capabilities, small size and weight, high degree of intercept security and dielectric isolation, and long term cost reduction. These desirable features of optical fibers have strongly stimulated efforts both in fiber optics and in supporting technologies such as fiber optic coupling.

Connectors for joining together optical fibers are critical to systems which transmit data over optical fibers. If such connectors are not efficient, fiber optic data transmission would be a less feasible alternative to transmission over metallic conductors. Inefficient connectors can make it necessary to manufacture unbroken cables miles in length or to detect and actively reamplify the transmitted signal at every break in the optical fiber. Repeaters are devices which provide such detection and reamplification. However, they are expensive active components which decrease the reliability of the system and add to the energy consumption of the system. Thus, efficient passive connectors which are also cost effective are an economic necessity.

Practically all devices which employ optical fibers can benefit from improved cost effective connectors. For example, the connectors which form part of a star-coupler typically contribute from about one-third to one-half of the entire cost of the star-coupler. Thus, a decrease in the cost of such connectors can provide a significant decrease in the cost of a star-coupler employing a number of such connectors.

Difficulty has been encountered in providing proper alignment between the two optical fibers joined by a connector. Such alignment is critical in an axial direction (end separation) as well as in a radial direction (lateral offset). Improper alignment in either of these directions produces significant losses.

Further difficulty has been encountered in the assembly and connection of optical connectors. Known connectors which connect single optical fibers are typically provided with a sleeve which is insertable into the connector. It is within this sleeve that the two fibers actually interface with each other. However, these sleeves are quite small and are prone to loss. To further complicate matters, these sleeves have very thin walls. Thus a connector may be used without the sleeve unbeknownst to a user and yet transmit some amount of light. This results in poorly operating or inoperative devices. In fact, devices incorporating such connectors have been returned to manufacturers as defective when in actuality, the consumer has assembled the connector without the sleeve.

Additionally, these sleeves are generally constructed from stainless steel and the bore through the sleeve is often displaced from the true center of the sleeve. This is due largely to the "walking" of a drill bit away from the desired location of the bore as the drilling process is initiated. Proper alignment is practically impossible without the sleeve. Furthermore, the bore through these sleeves is generally tapered. The actual length of the portion of the bore which has a diameter equal to the diameter of the fiber element is significantly less than the length of the alignment sleeve, perhaps only one-fifth of such length. This reduces the effective length of the sleeve which maintains the fiber in a desired concentric position, thus contributing to inaccurate alignment of the fibers. Furthermore, optical fibers are often attached to connectors by crimping a metallic sleeve of the connector around the optical fiber, however, this can damage the optical fiber.

Furthermore, known connectors are unnecessarily complex, thus also contributing to the difficulty of properly assembling the connector and connecting it to a mating connector, as well as adding to the cost of the connector.

Another disadvantage of known connectors is their lack of adjustability. Although maximum light transfer and low loss are generally desirable, it is advantageous at times that the connector be adjusted to increase loss and reduce light transfer. For example, light input to a star-coupler is often output non-uniformly to the N optical fibers of the coupler due to the structure of the mixing element employed in the coupler as well as non-uniformity among the optical fibers. In such circumstances it is desirable to adjust the light loss in each fiber so that light levels are approximately uniform in each fiber.

SUMMARY OF THE INVENTION

The present invention relates to improved optical connectors and methods for joining optical fibers.

Specifically, the optical connector comprises a housing and an insertable adapter, each of which is preferably fabricated by injection molding. The adapter includes an insert capable of being formed with high tolerances. The insert is preferably fabricated from ceramic material and has a concentric bore therethrough. The bore as well as the adapter each have a circular cross-section of constant diameter.

The housing is provided with an alignment channel in communication with opposite ends of the housing. One end is configured to mate with a removable fiber optic connector having an optical fiber connected thereto. The optical fiber has a centrally located fiber element comprising a core material and a cladding material for transmitting optical signals. Once this mating fiber optic connector is attached to the housing, its fiber element is concentrically positioned within the alignment channel. The other end of the housing receives the adapter which may be adjustably inserted into the housing to a desired depth.

The ceramic insert is firmly attached to and partially inserted into the end of the adapter which is inserted into the housing. A second optical fiber which has been appropriately stripped of a portion of its buffer and jacket layers is inserted into the adapter and is firmly fastened thereto by an adhesive and/or heat shrinkable means. The second optical fiber is inserted into the adapter a distance such that the end of the stripped second optical fiber extends through the bore in the ceramic insert and is approximately flush with the end of the ceramic insert. The end of the fiber element is preferably polished.

The adapter is inserted into the end of the housing opposite the end removably connected to the mating fiber. Insertion of the adapter into the housing includes insertion of the ceramic insert into the alignment channel. Thus, the separation distance between the two mating fiber elements can be adjusted by adjusting the distance which the adapter is inserted into the housing. Advantageously, the adapter and the housing are provided with threaded sections which permit a fine adjustment of the separation distance. Alternatively, frictionally engaged mating surfaces such as tapered surfaces may be employed instead of the threaded sections. Once a desired separation distance is obtained, the adapter is locked with respect to the housing, such as by introducing an adhesive into a bore through the housing extending to the adapter.

In another embodiment, a housing is provided having an alignment channel into which the insert is directly inserted. A fiber element is adjustably inserted a desired distance into the insert. In accordance with desired operating characteristics, the end of the fiber element may be flush with the end of the insert or displaced slightly on either side of the end of the insert. Once the desired separation is obtained, a heat shrinkable means is shrunk around a split bushing which fixes the optical fiber to the housing and prevents movement between the optical fiber and the housing.

Accordingly, it is a principal object of the invention to provide new and improved fiber optic connectors and methods for joining optical fibers.

A further object of the invention is to provide cost effective fiber optic connectors.

Another object of the invention is to provide a fiber optic connector which does not require a removable alignment sleeve.

Still another object of the invention is to provide a fiber optic connector which insures proper alignment of optical fibers.

Another object of the invention is to provide a fiber optic connector having a built-in alignment channel in which the separation distance between the ends of two joined fiber elements may be adjusted.

BRIEF DESCRIPTION OF THE DRAWINGS

These and other objects, features, and advantages of the present invention will become more readily apparent from the following detailed description of the invention in which:

FIG. 5 is a cross-sectional view of another embodiment of the invention; and

FIG. 6 is a cross-sectional view along line 6—6 of FIG. 5.

DETAILED DESCRIPTION OF THE INVENTION

Figure 1:
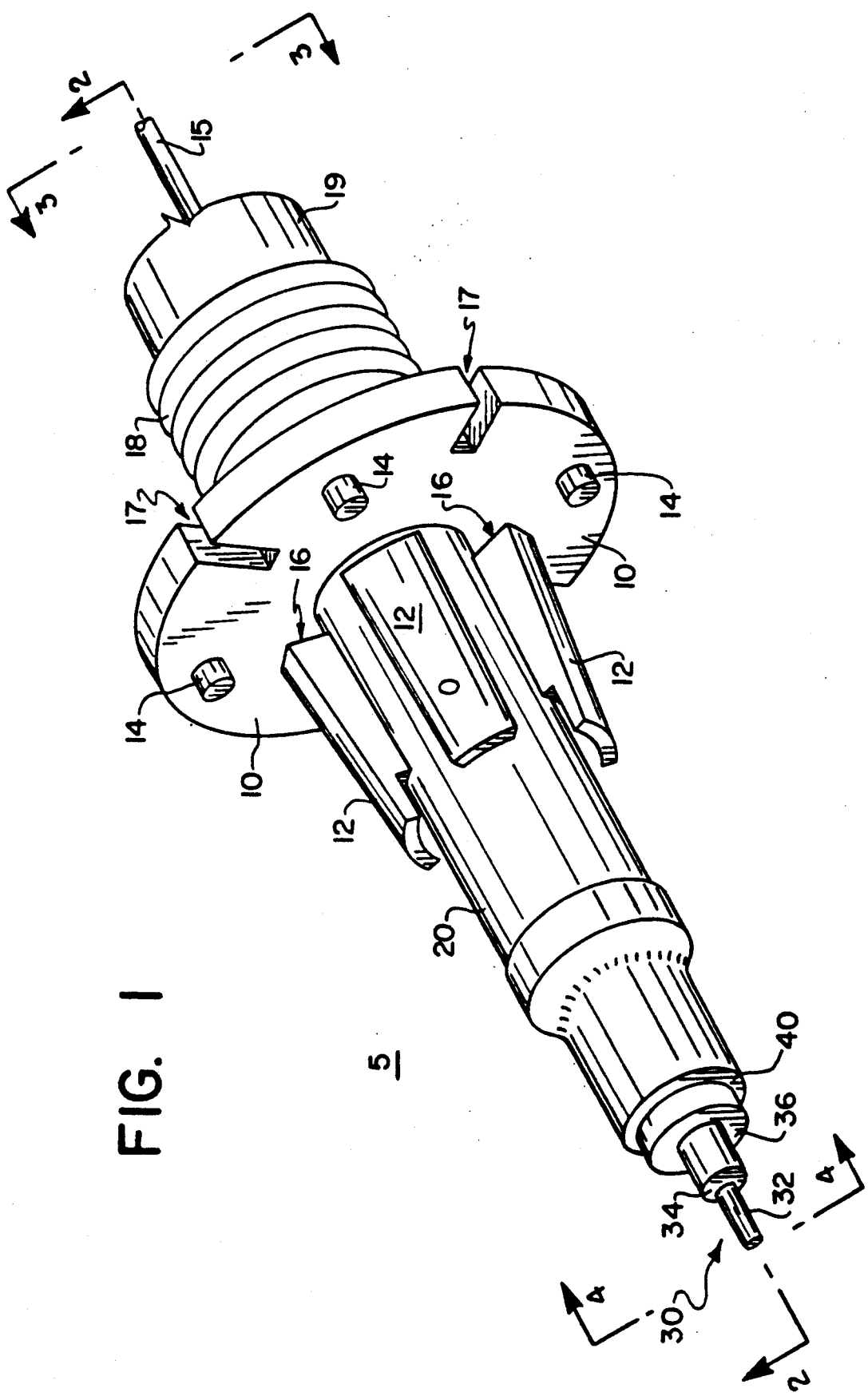
FIG. 1 is a perspective view of a preferred embodiment of the invention.

Referring to FIG. 1, a presently preferred embodiment of a connector 5 of the invention is depicted comprising housing means 10 and an adapter 20. A first optical fiber 30 is connected to adapter 20.

Housing 10 is provided with tapered keys 12, locking lugs 14 and an annular groove 16 located behind each tapered key 12. Keys 12, lugs 14 and grooves 16 advantageously permit connector 5 to be firmly attached to a supporting bulkhead or walled structure. Insertion of housing 10 into an opening in a bulkhead or walled structure is accomplished by inserting tapered keys 12 through the opening until the wall of the structure located near the opening is inserted into annular grooves 16. Locking lugs 14 are insertable into mating holes in the walled structure to prevent rotation of the connector. Slots 17 preferably permit some degree of flexibility to the portions of housing 10 to which lugs 14 are attached, thus facilitating insertion of the housing means into the walled structure and insertion of locking lugs 14 into the mating holes.

Housing 10 is also provided with a threaded male section 18 to mate with a threaded female assembly (not shown) which includes a fiber optic cable 19 having a central light transmitting fiber element 15. However, alignment of the two fiber elements 15, 32 is accomplished within housing 10.

As depicted in FIG. 1, an optical fiber 30 is connected to connector 5 via adapter 20. The optical fiber 30 comprises a fiber element 32, a buffer 34 and a jacket 36. As one skilled in the art will appreciate, fiber element 32 is surrounded by a relatively thin cladding layer (not shown) to confine and guide the light within a core of fiber element 32. Heat shrinkable means such as heat shrink tube 40 is provided to prevent excessive flexing of the fiber at its connection to adapter 20.

Housing 10 and adapter 20 are preferably injection molded and may be constructed from any suitable material such as plastic.

Figure 2:
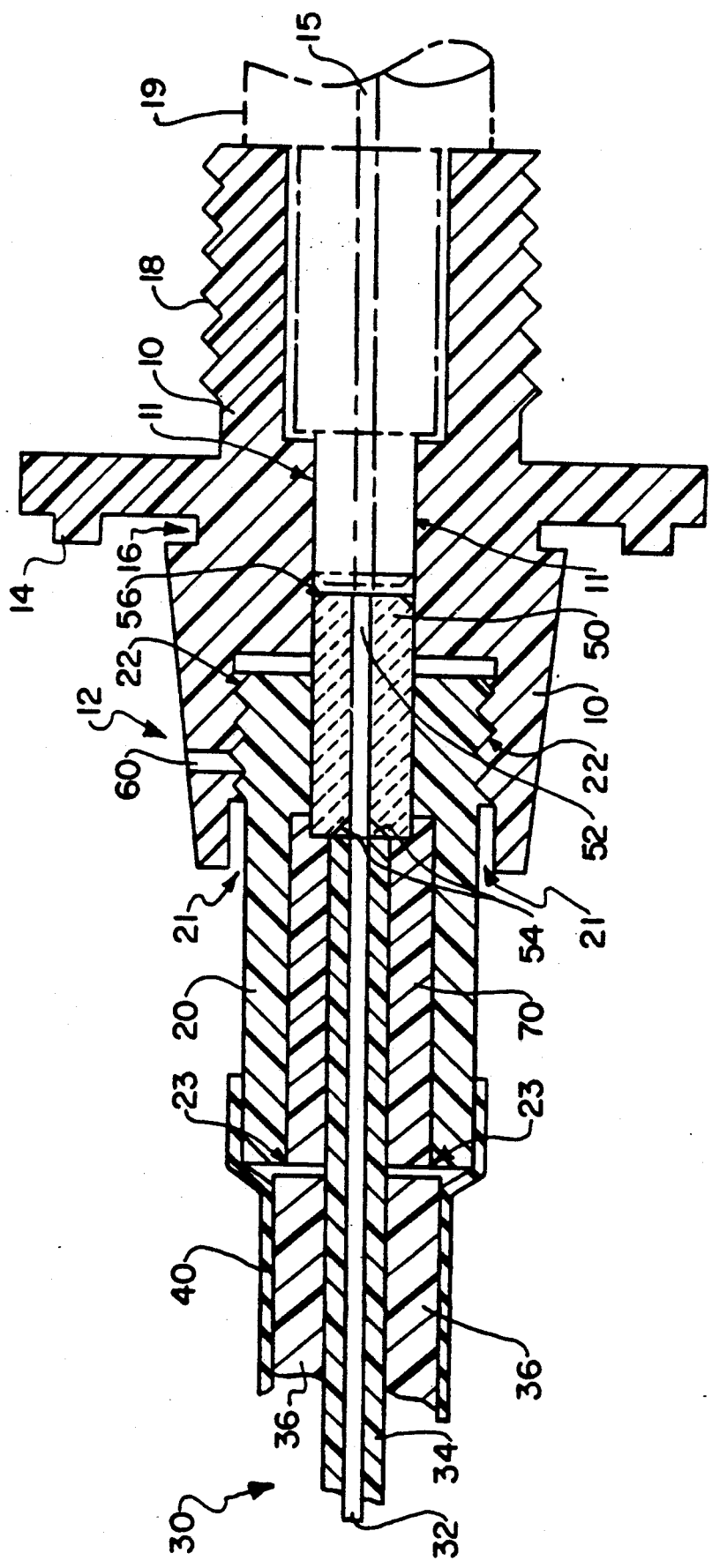
FIG. 2 is a cross-sectional view along line 2—2 of FIG. 1.

FIG. 2 is a cross-sectional view of the connector of FIG. 1. As can be seen, the housing further comprises an alignment channel 11, a receiving channel 21, and a bore 60. The connector further comprises an insert 50 of circular cross-section having an axial bore 52 into which is inserted fiber element 32. Axial bore 52 is provided with a circular cross-sectional area substantially only large enough to receive fiber element 32. Insert 50 is also provided with a champhered edge 56 to facilitate insertion into alignment channel 11. Advantageously channel 11 has a circular cross-sectional area only slightly larger than that of insert 50. Alternatively, a champhered edge (not shown) may be provided to alignment channel 11. Bore 60 is provided through housing 10 to provide access to a threaded section 22 of adapter 20. The optical fiber 30 is firmly attached to adapter 20 by adhesive 70, illustratively an epoxy.

Insert 50 is preferably constructed from a ceramic material and provided with a conical section 54 at one end to guide fiber element 32 into bore 52 during assembly of the connector. Alternatively, a separate conical lead-in structure may be employed instead of conical section 54. Preferably, axial bore 52 is formed in the ceramic material before the ceramic material hardens. Illustratively, insert 50 is 0.25 inches long and 0.0848 inches in diameter.

Bore 60 is provided to permit entry therein of an adhesive such as epoxy to fasten adapter 20 to housing 10. Specifically, adapter 20 may be threaded into housing 10 to any desired depth so as to permit adjustment of the amount of light transferred through fiber element 32 into the mating fiber. Once the desired depth is obtained, epoxy is introduced into bore 60 and fastens adapter 20 to housing 10 to prevent any respective movement.

Figure 3:
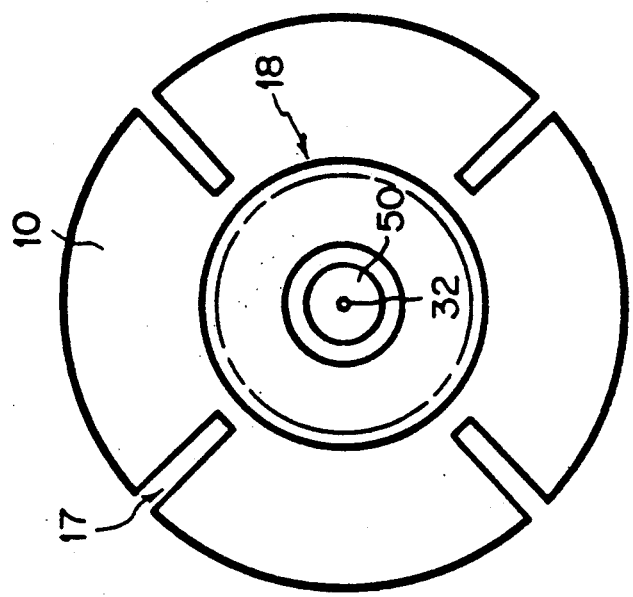
FIG. 3 is a front view of the device of FIG. 1.

Referring now to FIG. 3, there is depicted a frontal view of the device of FIG. 1. As can be seen, fiber element 32 of optical fiber 30 appears in the center of ceramic insert 50.

Figure 4:
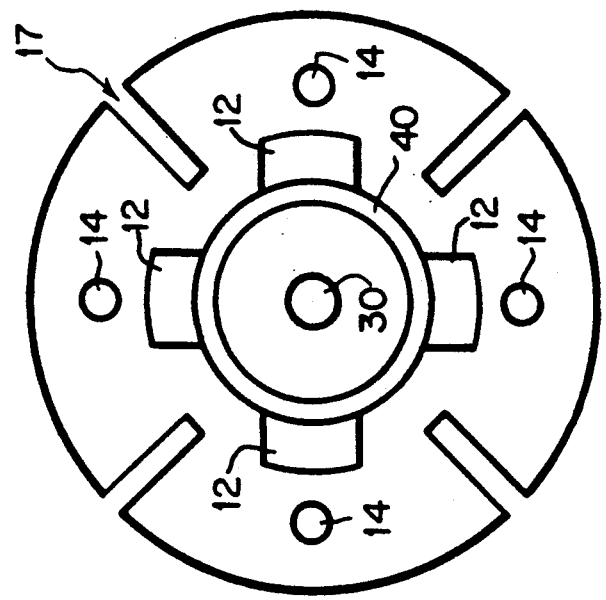
FIG. 4 is a rear view of the device of FIG. 1.

FIG. 4 is a rear view of the device of FIG. 1. Four locking lugs 14 are provided for engaging four holes in the wall of the device in which the connector is mounted. Keys 12 are the four tapered sections of housing 10. Slots 17 provide an amount of flexibility to the portion of housing 10 surrounding locking lugs 14. This flexibility facilitates insertion of locking lugs 14 into corresponding holes in the walled structure into which the connector is inserted.

FIG. 5 depicts a cross-sectional view of a further embodiment of the invention in which elements similar to those in the embodiment of FIGS. 1–4 are labelled similarly. Housing 10, however, serves to directly interface fiber 30 and ceramic insert 50; a threadable structure similar to threadable adapter 20 of FIG. 1 is not required in this embodiment. The housing of this embodiment is also preferably injection molded and includes alignment channel 11 for aligning the fiber element of optical fiber 30 within ceramic insert 50 with a mating fiber element.

Additionally, bushing means such as an axially slit bushing 80 is provided. Bushing 80 is constructed from a somewhat deformable material such as plastic and is provided with an internal diameter approximately equal to the diameter of fiber 30, such internal diameter being measured when bushing 80 is slightly separated along its axial slit, i.e., when a gap exists in the wall of bushing 80. Thus, radial pressure applied to bushing 80 by heat shrink tube 40 serves to close the gap along the axial slit and apply pressure to buffer 34 of optical fiber 30, thereby preventing movement of optical fiber 30.

Housing 10 is provided with a section 13 near bushing 80 of approximately the same diameter as the external diameter of bushing 80. Advantageously, use of commercially available heat shrink tubing having an inside diameter approximately equal to or slightly greater than the outside diameter of bushing 80 before shrinking will exert sufficient force on bushing 80 and section 13 after the application of heat so as to prevent movement of fiber 32 within insert 50. Alternatively, a small amount of adhesive such as epoxy may be employed during assembly to attach the optical fiber to housing 10, insert 50 or bushing 80. Additionally, adhesive may be employed to attach bushing 80 to housing 10.

FIG. 6 depicts a cross-section of bushing 80 of FIG. 5. As will be appreciated, radial compressive force exerted by shrink tube 40 tends to close a gap 81 in bushing 80 thereby preventing movement of buffer 34 and thus optical fiber 30.

The embodiment of FIGS. 1–4 is assembled and adjusted as follows. Insert 50 is inserted into adapter 20 a predetermined distance. Advantageously, this distance is not critical since the separation distance between the end of the fiber element 32 within insert 50 and the end of the mating fiber element may be adjusted in accordance with the invention.

Optical fiber 30 is then stripped of jacket 36 along a suitable length, revealing buffer 34. Buffer 34 is then stripped off along a shorter suitable length slightly longer than the length of insert 50. These lengths are chosen such that upon assembly, the end of jacket 36 abuts adapter 20 at a wall 23, the end of buffer 34 abuts the end of ceramic insert 50 near conical section 54, and the end of fiber element 32 extends beyond the opposite end of ceramic insert 50.

Once fiber 30 is appropriately stripped, adhesive, preferably epoxy, is placed into the rear of adapter 20. Fiber 30 is then inserted into the rear of adapter 20 until the end of jacket 36 abuts adapter 20, the end of buffer 34 abuts insert 50, and the end of fiber element 32 extends beyond insert 50. Heat shrink tubing 40 is then placed around a predetermined length of optical fiber 30 and the interface between jacket 36 and adapter 20 and shrunk by the application of heat.

Once insert 50 is inserted into adapter 20 and optical fiber 30 attached, the excess of fiber element 32 protruding from bore 52 beyond insert 50 is removed. Such excess may be removed by a technique known as "scribe and cleave" in which fiber element 32 is first scored or scribed at a location slightly displaced from the exposed end of insert 50. The end of the excess length of fiber element 32 is then forced in a radial direction until the fiber element breaks at the location where it was scored, leaving the end of fiber element 32 extending slightly beyond the insert. The end of fiber element 32 may then be polished resulting in the end of fiber element 32 becoming flush with the end of insert 50. Alternatively, the end of fiber element 32 is removed by the scribe and cleave technique as near as possible to the end of insert 50 so as to provide an approximately flush fit without the need for polishing.

Adapter 20 may then be threaded into housing 12. As adapter 20 is threaded into housing 10, the end of fiber element 32 is correspondingly inserted further into alignment channel 11. A mating connector is threaded onto threads 18 of the connector, and the corresponding mating fiber element 15 is inserted into alignment channel 11 a predetermined depth. Light is preferably input to one of the fiber elements and light output power measured at the other fiber element. Adapter 20 may then be further threaded into housing 10 until the desired operating characteristics are obtained. Once this is accomplished, a small amount of adhesive is inserted into bore 60 to prevent further adjustment.

Alternatively, the mating threads of housing 10 and adapter 20 may be replaced with frictionally engaged mating surfaces such as smooth surfaces or slightly tapered surfaces, so that increased insertion of section 20 into housing 10 is met with increased resistance. Again, once adjustment is complete and desired operating characteristics are obtained, adhesive may be inserted into bore 60 to prevent further movement between adapter 20 and housing 10.

Assembly and adjustment of the embodiment depicted in FIG. 5 may be accomplished in a variety of ways and is preferably accomplished as follows. Insert 50 is inserted into alignment channel 11 from the front of housing 10. Optical fiber 30 is then stripped of jacket 36 along a suitable length, revealing buffer 34. Buffer 34 is then stripped off along a shorter suitable length approximately as long as insert 50 or slightly longer. These lengths are chosen such that during assembly, optical fiber 30 can be inserted into housing 10 and adjusted so as to be flush with the end of insert 50 adjacent to the mating fiber 15. Advantageously, the connector may be adjusted such that the end of fiber element 32 may be slightly displaced from the end of insert 50, in accordance with desired operating characteristics.

Once fiber 30 and more particularly the end of fiber element 32 within the connector is placed as desired, heat shrink tubing 40 surrounding split bushing 80, a portion of jacket 36, and a portion of housing 10, is shrunk by the application of heat thereby firmly fastening optical fiber 30 to the connector.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the spirit and scope of the present invention.

What is claimed is:

1. A fiber optic connector for aligning and joining together two optical fibers comprising:
    housing means having a first end for receiving a first removable insertable optical fiber assembly insertable to a predetermined depth, a second end for receiving a second optical fiber insertable to a predetermined depth, and an alignment channel of constant cross-sectional area providing communication between said first and said second ends;
    a rigid insert of constant cross-sectional area slidably insertable into said alignment channel and having a concentric bore of constant diameter therethrough for receiving a fiber element of said second optical fiber; and
    adapter means in which the insert is mounted for adjustably introducing said insert and said fiber element of said second optical fiber into said alignment channel, said adapter means and said fiber element of said second optical fiber being insertable into said second end an adjustable distance such that said insert is inserted in said alignment channel so as to have a desired separation distance between the end of a fiber element of said first mating removable insertable optical fiber and an end of said fiber element of said second optical fiber within said alignment channel;
    wherein said end of said fiber element of said second optical fiber is maintained concentrically within said alignment channel, and said separation distance is adjusted by adjusting the distance which said adapter means is inserted into said second end.

2. The fiber optic connector of claim 1 wherein said adapter means and said second end are each provided with frictionally engaged mating surfaces.

3. The fiber optic connector of claim 2 wherein said frictionally engaged mating surfaces are tapered.

4. The fiber optic connector of claim 1 wherein said adapter means and said second end are each provided with mating threaded sections.

5. The fiber optic connector of claim 4 wherein the distance which said adapter means is inserted into said second end is adjusted by screwing said adapter into and out of said second end of said housing.

6. The fiber optic connector of claim 5 further comprising locking means for preventing respective movement of said mating threaded sections.

7. The fiber optic connector of claim 6 wherein said locking means comprises a bore in said housing extending to said adapter means into which an adhesive in introduced.

8. The fiber optic connector of claim 1 wherein said insert is fabricated from ceramic material.

9. The fiber optic connector of claim 1 wherein said second optical fiber is attached to said adapter means by adhesive.

10. The fiber optic connector of claim 1 wherein said end of said fiber element of said second optical fiber is polished.

11. The fiber optic connector of claim 1 wherein said housing and said adapter means are each fabricated by injection molding.

12. The fiber optic connector of claim 1 wherein said alignment channel is provided with a circular cross-sectional area substantially only large enough to receive said insert.

13. A fiber optic connector for aligning and joining together two optical fibers comprising:
    a housing having an alignment channel of constant cross sectional area extending therethrough, said housing being adapted at a first end to receive a fiber element insertable into said alignment channel to a predetermined depth, said housing being adapted at a second end to receive an optical fiber;
    an adapter adjustably insertable into said second end of said housing to a desired depth; and
    a rigid insert of constant cross-sectional area inserted into a first end of said adapter, said insert having a bore extending therethrough for receiving a fiber element of said optical fiber;
    wherein insertion of said adapter into said second end of said housing includes insertion of said insert into said alignment channel.

14. The fiber optic connector of claim 13 wherein said adapter and said second end each have frictionally engaged mating surfaces.

15. The fiber optic connection of claim 14 wherein said frictionally engaged mating surfaces are tapered.

16. The fiber optic connector 13 wherein said adapter and said second end each have mating threaded sections.

17. The fiber optic connector of claim 16 wherein a separation distance between the end of the fiber element of said threaded connector and the end of the fiber element in said insert is adjustable by threading said adapter into and out of said housing.

18. The fiber optic connector of claim 16 further comprising locking means for preventing respective movement of said mating threaded sections.

19. The fiber optic connector of claim 18 wherein said locking means comprises a bore in said housing extending to said adapter into which an adhesive is introduced.

20. The fiber otic connector of claim 13 wherein said insert is fabricated from ceramic material.

21. The fiber optic connector of claim 13 wherein said optical fiber is attached to said adapter by adhesive.

22. The fiber optic connector of claim 13 wherein an end of said fiber element of said optical fiber is polished.

23. The fiber optic connector of claim 13 wherein said housing and said adapter are each fabricated by injection molding.

24. The fiber optic connector of claim 13 wherein said alignment channel is provided with a circular cross-sectional area substantially only large enough to receive said insert.

25. A fiber optic connector for aligning and joining together two optical fibers comprising:
    a housing having an alignment channel of constant cross sectional area, a first end adapted for attachment to a mating connector having a centrally located first optical fiber concentrically insertable into said alignment channel, and a second end;
    a ceramic insert having a bore therethrough positioned concentrically within said alignment channel, said bore being adapted for receiving a fiber element of a second optical fiber for alignment with said centrally located optical fiber of said mating connector;

bushing means attached to said second end of said housing for surrounding a portion of said second optical fiber; and heat shrinkable means surrounding said bushing means and surrounding a portion of said housing for providing radially inwardly directed force resulting from shrinking;

wherein said heat shrink means, once shrunk, applies sufficient force to said bushing means and said portion of said housing such that movement of said optical fiber within said connector is prevented.

26. The fiber optic connector of claim 25 wherein said bushing means is axially split and provided with a gap and application of force from said heat shrink means tends to close said gap.

27. The fiber optic connector of claim 26 wherein said heat shrinkable means is heat shrink tubing.

28. The fiber optic connector of claim 25 wherein said housing is fabricated by injection molding.

29. The fiber optic connector of claim 25 wherein said alignment channel is provided with a circular cross-sectional area substantially only large enough to receive said insert.

* * * * *